US011331905B2

(12) United States Patent
Liker et al.

(10) Patent No.: US 11,331,905 B2
(45) Date of Patent: *May 17, 2022

(54) PRINTING SYSTEM AND METHOD

(71) Applicant: Illinois Tool Works Inc., Glenview, IL (US)

(72) Inventors: Stephen Jay Liker, Sherman, CT (US); Donald MacKay, Roxbury, CT (US); Yu Du, Bethany, CT (US); Tzer-Yi Chen, Brookfield, CT (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/111,280

(22) Filed: Dec. 3, 2020

(65) Prior Publication Data
US 2021/0086505 A1 Mar. 25, 2021

Related U.S. Application Data

(63) Continuation of application No. 16/043,327, filed on Jul. 24, 2018, now Pat. No. 10,882,309.

(60) Provisional application No. 62/536,508, filed on Jul. 25, 2017.

(51) Int. Cl.
*B41J 3/01* (2006.01)
*B41J 2/045* (2006.01)
*B41J 2/21* (2006.01)

(52) U.S. Cl.
CPC ......... *B41J 2/04505* (2013.01); *B41J 2/2103* (2013.01); *B41J 2/2117* (2013.01); *B41J 3/01* (2013.01)

(58) Field of Classification Search
CPC .......................................................... B41J 3/01
See application file for complete search history.

(56) References Cited

U.S. PATENT DOCUMENTS 10,882,309 B2 * 1/2021 Liker .......................... B41J 3/01

OTHER PUBLICATIONS

First substantive examination report dated Dec. 23, 2021 for corresponding European Patent Application No. 18752946.6 (3 pages).

* cited by examiner

*Primary Examiner* — Sharon Polk
(74) *Attorney, Agent, or Firm* — Christopher R. Carroll; The Small Patent Law Group LLC

(57) ABSTRACT

A printing system and method print different colors onto a target object to form a machine-readable data representation having a symbol contrast of at least 40%. The printing system and method direct print heads to print the different colors by printing a base layer of a first color of the different colors on the target object and printing an upper layer of a different, second color of the different colors on top of the base layer of the first color, or by printing print the machine-readable data representation as an interdigitated data representation by printing the different colors onto the target object so that none of the different colors is printed on top of another color of the different colors.

21 Claims, 4 Drawing Sheets

PRINTING SYSTEM AND METHOD

CROSS-REFERENCE TO RELATED APPLICATIONS

This application is a continuation of U.S. patent application Ser. No. 16/043,327, which was filed on 24 Jul. 2018 (now U.S. Pat. No. 10,882,309), and which claims priority to U.S. Provisional Patent Application No. 62/536,508, which was filed on 25 Jul. 2017. The entire disclosures of these applications are incorporated herein by reference.

BACKGROUND

Bar codes are used on product packaging for purposes such as, inventory management, tracking, and point of sale management. Bar codes are encoded data using a machine-readable symbology, such as Universal Product Code (UPC), Interleaved Two of Five (ITF), European Article Number (EAN), and other standards.

To ensure that bar codes are reliably readable by scanning equipment, various associations and groups have formed grading standards, such as the GS-1 Bar Code Verification For Linear Symbols, for a scannable printed bar code. Failure to meet these standards can render a printed bar code unreadable, which can result in the imposition of monetary penalties on the products manufacturer or packaging company by retailers. For example, retailers may refuse to stock product from a consumer products company that repeatedly provides packaging that has erroneous bar codes or bar codes that are not able to be scanned.

Printing bar codes on corrugated material has particular challenges. For example, variability in color and/or reflectance of corrugated material can negatively affect the ability of an inkjet or direct print system to produce a bar code that meets the grading standards. Corrugated material, such as containerboard, liner, cardboard and fiberboard, is primarily produced in a brown color with low reflectance commonly known as kraft. Typically, manufacturers of the corrugated material do not use brightness or reflection as a measured attribute of the corrugated material, so the color and/or reflectance of the printed surface is highly variable between paper mills and manufacturing runs. The fibers of the paper also produce a surface texture that can alternate between dark and light. The generally darker color and low reflectance of corrugated material generally results in relatively low symbol contrast (SC), which reduces the quality of the bar code and makes the bar code more difficult for scanners to read spaces within the bar code.

BRIEF SUMMARY

In one embodiment, a printing system includes one or more print heads configured to print different colors onto a target object to form a machine-readable data representation on the target object having a symbol contrast of at least 40%. The printing system also includes a controller configured to direct the one or more print heads to print the different colors by directing the one or more print heads to one or more of print the machine-readable data representation as a multi-layer data representation by printing a base layer of a first color of the different colors on the target object and printing an upper layer of a different, second color of the different colors on top of the base layer of the first color, or print the machine-readable data representation as an interdigitated data representation by printing the different colors onto the target object so that none of the different colors is printed on top of another color of the different colors.

In one embodiment, a printing method includes aligning a target object along or parallel to a travel direction, moving one or more of a printing assembly or the target object along the travel direction, and printing a machine-readable data representation with two or more inks of different colors onto the target object to form the machine-readable data representation on the one or more target objects as having a symbol contrast of at least 40%.

In one embodiment, a printing system includes a printing assembly having one or more print heads configured to print two or more inks onto a target object having a porous surface, and a conveyance system configured to move one or more of the printing assembly or the target object in a travel direction. The conveyance system is configured to move the one or more of the printing assembly or the target object in the travel direction so that the one or more print heads complete printing of a machine-readable data representation formed by the two or more inks onto the target object during one or more of a single pass of the printing assembly over the target object or a single pass of the target object below the printing assembly. The machine-readable data representation is printed to have a symbol contrast of at least 40%.

BRIEF DESCRIPTION OF THE DRAWINGS

Reference is now made briefly to the accompanying drawings, in which.

DETAILED DESCRIPTION

Figure 1:
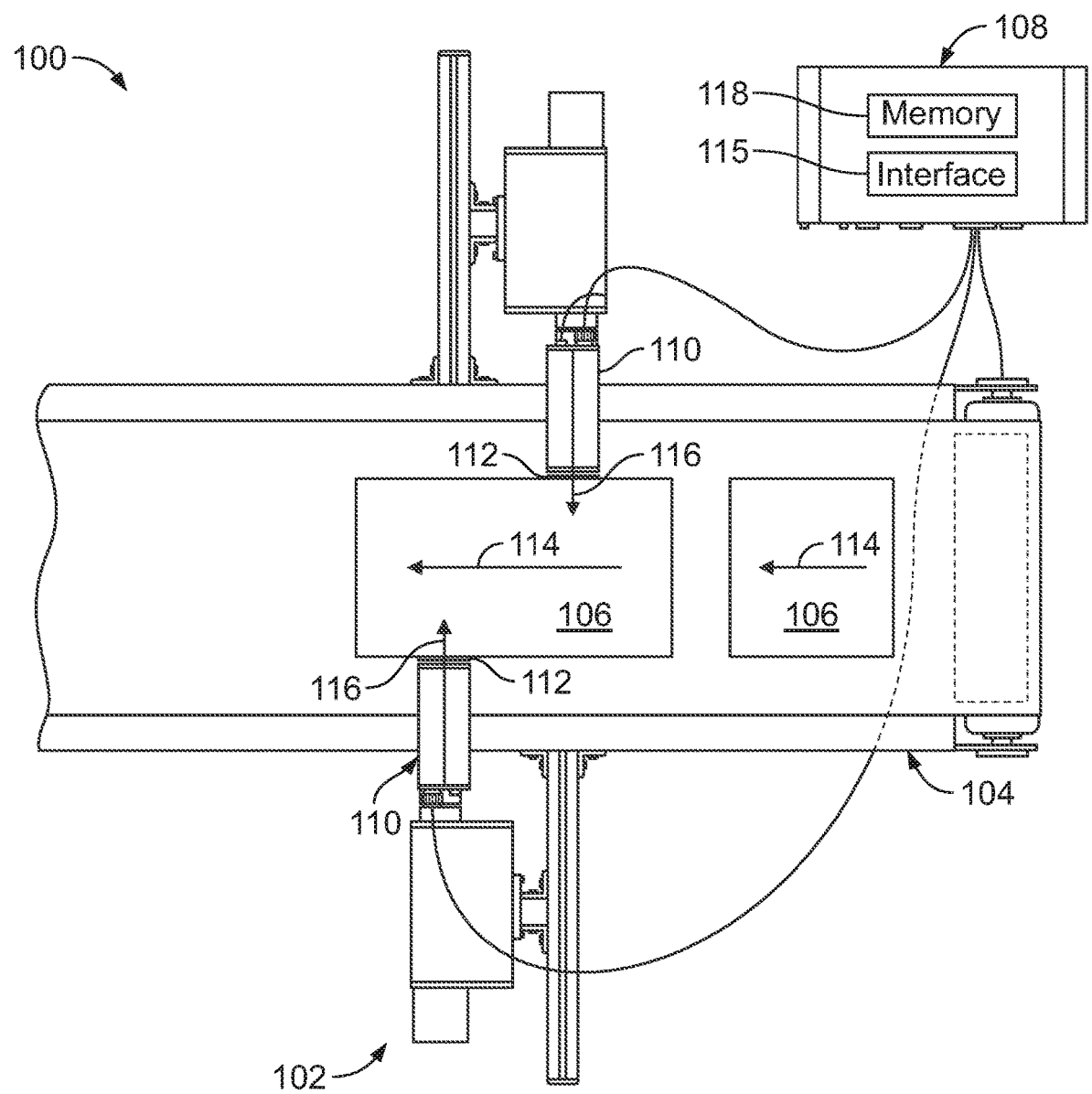
FIG. 1 is a schematic diagram of a printing system in accordance with an embodiment.

One or more embodiments of the inventive subject matter described herein relate to systems and methods for printing a machine-readable data representation on one or more target objects that meets a grading standard. In one embodiment, a printing system can include one or more print heads for printing different layers or colors of ink (or other printing material) to form a bar code. The print heads can print a base or background layer of a first color on the target object and an upper or foreground layer of a second color on top of the base color. Alternatively, the printing system can include one or more print heads for printing different colors of ink in an interdigitated pattern onto the target object so that none of the colors is printed on top of another color. The print heads may be ink jet print heads that dispense ink via nozzles, or another type of ink dispenser, such as pads having ink disposed thereon, rollers having ink disposed thereon, or the like.

One or more embodiments of the inventive subject matter described herein relate to systems and methods for single pass printing on one or more various objects. Single pass printing refers to a printing system setup where target objects pass one or more print heads a single time for printing one or more images onto the target objects. The target objects may not move in another direction during printing or between printing different portions of a bar code (or other indicia) on the target objects. The target object may pass below the print head(s) a single time during printing, or the print head(s) may pass over the target object a single time during printing. In one embodiment, the printing system includes a conveyance system to move one or more target objects in a travel direction through a print zone of the print heads for printing the image. Alternatively, the print heads can move in a travel direction while the target objects remain stationary or substantially stationary (e.g., the location of the target objects changes no more than 3%, or more than 1%).

In one or more embodiments, the printing system can include a single print head that applies different layers or colors of ink or other printing material. For example, the print head can include a first set of nozzles and a second set of nozzles, with the first set of nozzles positioned ahead of the second set of nozzles relative to the travel direction. As the target object travels through the print zone of the print head, the first set of nozzles applies a base or background layer of ink (e.g. white ink or ink of another color) onto the target object. The print zone can be the area or volume of space where the ink ejected by the print head contacts and prints indicia on the target object. The base layer of ink can at least partially or completely cure, or dry by either evaporation or absorption before the second set of nozzles applies an upper or foreground layer of ink (e.g. black ink or ink of another color) on top of the base layer of ink. For example, the base layer of ink can cure or dry to change a state of the ink so that the additional layer of ink has a printable surface on which to also cure or dry. The base layer of ink may not be completely cured or dried when the subsequent layer is applied, but may be cured or dried to a state that allows for the upper or foreground layer of ink to be printed thereon without mixing of the two layers of ink, without smudging or smearing either layer of ink, or the like. The layers of ink may not be completely coextensive with each other. For example, the upper layer of ink may extend over less than the entire surface area of the base layer of ink.

Alternatively, as the target object travels through the print zone of the print head, the first set of nozzles applies a first color of the interdigitated pattern (e.g. white ink or ink of another color) onto the target object. The second set of nozzles applies a second color of the interdigitated pattern onto the target object so that none of the colors are printed on top of another color, thereby forming a bar code. The interdigitated pattern is formed by different portions of the printed area of the target object receiving different inks, with no portion of the printed area receiving both inks or a lower layer of one ink with an upper layer of another ink.

In one or more embodiments, the printing system can include curing or drying devices to cure or dry the ink applied to the target objects. This curing can improve the quality of the final image that is printed on the target object. For example, curing devices can apply energy (e.g., plasma, heat, moving air, or the like) to one or more printed layers of ink after the layers are printed. The curing devices can be disposed after the print heads along the travel direction. After a print head that leads a curing device along the travel direction prints layers onto the target object, the curing device can then cure the layers printed on the target object. Additional curing devices and/or print heads can subsequently print and cure more layers.

FIG. 1 is a schematic diagram of an embodiment of the printing system 100. The printing system 100 includes a printing assembly 102, a conveyance system 104 for moving one or more target objects 106, and a controller 108 operatively connected (e.g., by one or more wired and/or wireless connections) to the printing assembly 102 and conveyance system 104. The target objects 106 may made from a porous corrugated material, such as containerboard, liner, cardboard, fiberboard and the like. Optionally, the target objects 106 be made from non-porous material, such as plastic film, shrink-wrap, coated cardboard, and the like.

The printing assembly 102 includes one or more print heads 110 configured to print an optical, machine-readable data representation 112 onto the target object 106 as the conveyance system 104 moves the target object 106 in a travel direction 114 through a print zone 116 of the print head 110. The representation 112 can be referred to herein as a bar code, but not all embodiments of the inventive subject matter are limited to bar codes. For example, the representation 112 can be a one-dimensional bar code, a two-dimensional bar code, a matrix barcode (e.g., a QR CODE), machine-readable text, machine-readable numbers, other machine-readable images or indicia, or the like. The depicted embodiment shows two print heads 110 configured to print the machine-readable data representation 112 at different locations on the target object 106. Optionally, the printing system 100 may include any number of print heads 110, including one, to print the machine-readable data representation 112 on the target object 106 at respective locations. The printing system may also include a print head to print a material to coat the target object with a film-forming, non-porous material (e.g., clear UV curable ink) to keep the colored material (e.g. pigments or dyes) near the surface when printed by subsequent print heads. For example, the print head can apply a clear coating layer onto the target object, with the other inks forming the machine-readable data representation printed onto the clear coating layer. The clear coating layer may only extend over the portion of the target object where the machine-readable data representation is to be printed, or may extend over a larger or smaller portion of the target object.

The machine-readable data representation 112 can be printed according to a set of parameters associated with a grading standard. For example, the machine-readable data representation 112 may be formed from one or more different colors in a multilayer or interdigitated pattern that have a symbol contrast of at least 40% and/or meet at least a Grade C of a GS-1 2d bar code verification standard. However, the machine-readable data representation 112 may be formed according the parameters of any machine-readable symbology, including, but not limited to Universal Product Code (UPC), Interleaved Two of Five (ITF), European Article Number (EAN), and other standards. The parameters associated with the grading standard may include, but are not limited to symbol contrast, reflectance, edge contrast, modulation, defects, decodability, bar width deviation, and the like. Alternatively, the printing system 100 may operate as described herein to print one or more indicia, text, numbers, images, etc., other than a bar code.

The controller 108 may include processing circuitry configured to perform one or more tasks, functions, or steps discussed herein. The controller 108 includes a user interface 115, such as a computer, touchscreen, display device, stylus, keyboard, electronic mouse, microphone, speaker, or the like, for communication with an operator to control operations of the printing system 100. It may be noted that "controller" as used herein is not intended to necessarily be limited to a single processor or computer. For example, the controller 108 may include multiple processors and/or computers, which may be integrated in a common housing or unit, or which may be distributed among various units or housings. Instructions to perform one or more aspects of the methods, steps, or processes discussed herein may be stored on a local storage medium or memory 118, which may include a tangible, non-transitory computer readable medium on which the instructions are saved and can be used by one or more processors to store and retrieve data. The data stored by the memory 118 can include, but need not be limited to, operating systems, applications, and informational data. Each operating system includes executable code that controls basic functions of the controller 108, such as interaction among the various components, communication with the printing system 100 and the conveyance system 104 via the user interface 115, and storage and retrieval of applications and data to and from the memory 118.

The conveyance system 104 is operatively connected to the controller 108 to move the target objects 106 along the travel direction 114 through the print zone 116 associated with the print heads 110. For example, the controller 108 may control when the conveyance system 104 moves the target objects 106, which direction(s) the target objects 106 are moved, how fast the target objects 106 are moved, and the like. The conveyance system 104 can include one or more belts, tracks, rails, or the like, that move or convey the target objects 106. While a conveyor belt system is shown in the illustrated embodiment, it may be noted that other systems, including linear guide systems and/or magnet driven systems, may be utilized as a conveyance system in other embodiments. In various embodiments, the conveyance system 104 may include one or more types of conveyor systems, including belt conveyors, roller conveyors (including belt driven roller conveyors and lineshaft roller conveyors), electric track vehicle systems, or the like. The conveyance system 104 can also include one or more encoders, sensors, and the like to determine positional information regarding the target objects 106 as they move along the conveyance system 104, such as position, velocity, orientation, and the like.

It may be noted that while only two target objects 106 are shown in FIG. 1 for ease and clarity of illustration, any number of target objects 106 may be spaced apart on the conveyance system 104 as part of a production process. Once each target object 106 is printed upon, the target object 106 may be removed or unloaded from the conveyance system 104, for example for further processing. Although not shown, the printing system 100 may optionally include loading and/or unloading systems (not shown) to load and unload the target objects 106 from the conveyance system 104. Optionally, the target objects 106 may be manually loaded and/or unloaded by operators. The printing system 100 may also include optical scanning or verification systems to scan, de-code, and verify the printed quality of the machine-readable data representation.

The print heads 110 are operatively connected to the controller 108 to receive control signals that direct the print head 110 to print on the target objects 106 while moving through the print zone 116, which corresponds to the location or area in which the print head 110 prints on target objects 106. For example, an operator may enter print data of the machine-readable data representation 112 into the user interface 115 of the controller 108. The print data can be rasterized into two colors (e.g. black and white) that can be printed on the target objects 106 as a multilayer or interdigitated pattern to render the machine-readable data representation 112. In one embodiment, the representation 112 can be printed in accordance with parameters or requirements associated with a verification standard, such as a bar code verification standard. The print heads 110 can represent ink jet print heads that dispense ink to print on one or more target objects 106. Optionally, one or more, or all, of the print heads 110 may be a different type of device that prints ink onto the target objects 106, such as flexography printing, offset lithography printing, digital printing, and the like. In some embodiments, the print heads 110 may also print a clear coat, for example, a protective coat, additionally or alternatively to a predetermined patterned to be printed.

Figure 2:
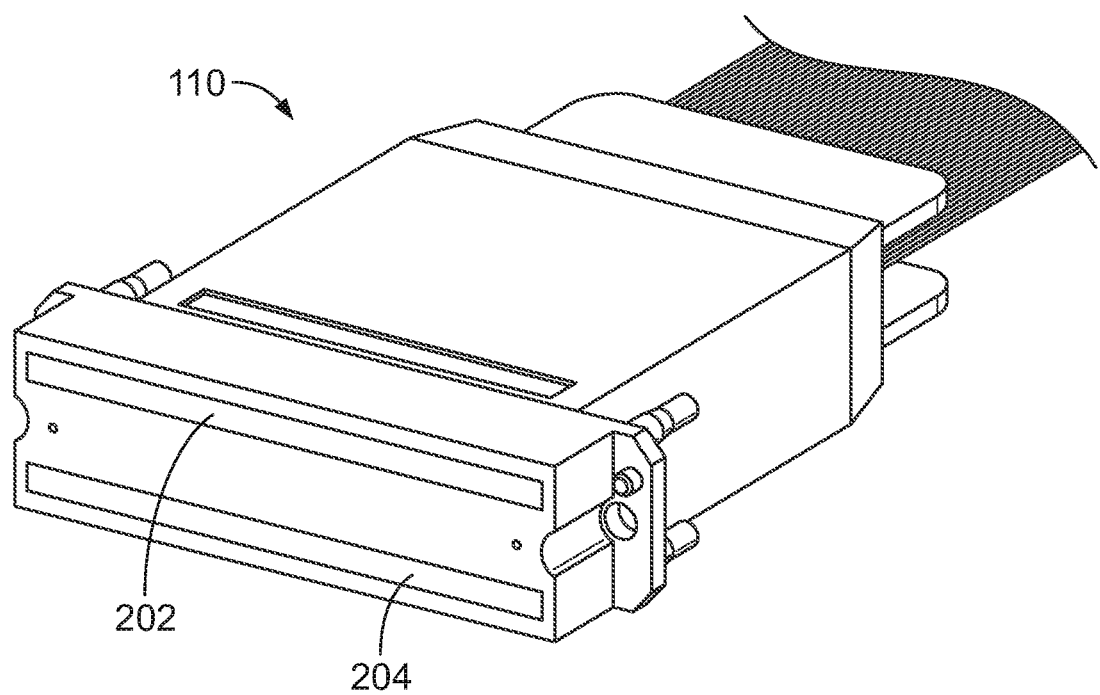
FIG. 2 is a perspective view of a print head in accordance with an embodiment.

FIG. 2 is a perspective view of the print head 110 in accordance with an embodiment. Each print head 110 includes a first set of nozzles 202 and a second set of nozzles 204 configured to eject one or more colors of ink in a single pass. The first set of nozzles 202 and the second set of nozzles 204 are configured to eject one or more colors as multiple layers or interdigitated pattern to form the machine-readable data representation 112. Optionally, each print head may have more or less sets of nozzles. For example, the print heads 110 may include four sets of nozzles to eject four colors, inks, and/or other printing material in a single pass.

Figure 3:
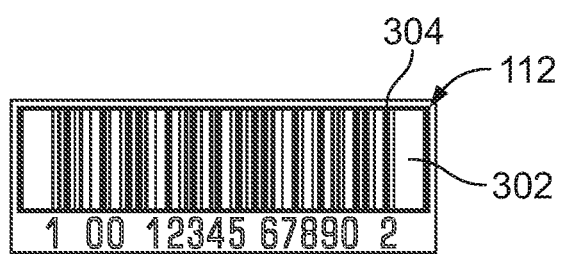
FIG. 3 is an image of a bar code printed as multiple layers of ink in accordance with an embodiment.

FIG. 3 is an example of the machine-readable data representation 112 printed as multiple layers of ink in accordance with an embodiment. The print heads 110 can print a machine-readable data representation 112 including a base or background layer of ink 302 of a first color on the target object 106 and an upper or foreground layer of ink 304 of a second color on top of the base layer of ink 302. For example, as the target object 106 travels through the print zone 116, the first set of nozzles 202 applies the base or background layer of ink 302 (e.g. white ink or ink of another color) onto the target object 106. The base layer of ink 302 of ink can at least partially or completely cure before the second set of nozzles 204 applies the upper or foreground layer of ink 304 (e.g. black ink or ink of another color) on top of the base layer of ink 302, thereby forming the machine-readable data representation 112. The printing system 100 may also be configured such that each color is printed with a dedicated print head, ink supply system, and curing or drying device to cure, pin or 'fix' the image before the next color ink is printed. This can provide an opportunity to improve the target object surface condition (e.g., surface energy and porosity), and achieve a higher quality image.

Figure 4:
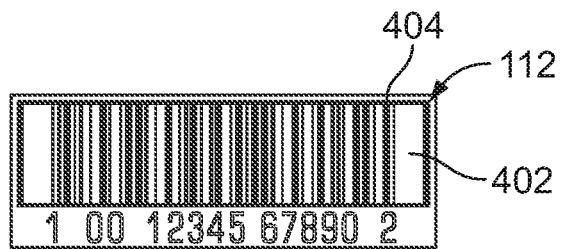
FIG. 4 is an image of the bar code printed as an interdigitated pattern of ink in accordance with an embodiment.

FIG. 4 is an example of the machine-readable data representation 112 printed as an interdigitated pattern of ink in accordance with an embodiment. The print heads 110 can print a machine-readable data representation 112 in an interdigitated pattern of different colors of ink onto the target object 106 so that none of the colors are printed on top of another color. For example, as the target object 106 travels through the print zone 116 the first set of nozzles 202 applies a first color 402 of the interdigitated pattern (e.g. white ink or ink of another color) onto the target object 106. The second set of nozzles 204 applies a second color 404 of the interdigitated pattern onto the target object 106 so that none of the colors is printed on top of another color, thereby forming the machine-readable data representation 112.

Figure 5:
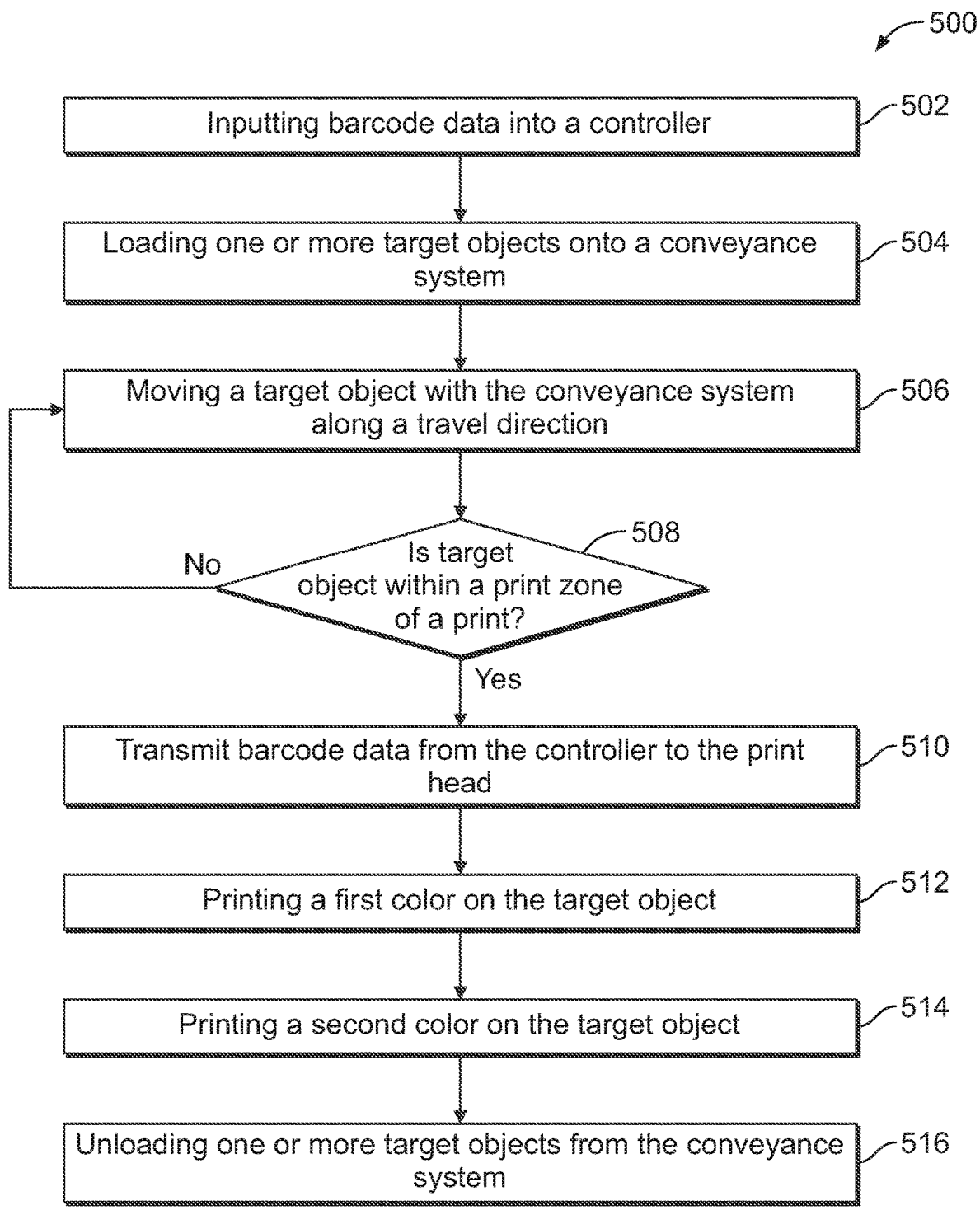
FIG. 5 is a flowchart of a method of printing a bar code on a target object in accordance with an embodiment.

FIG. 5 is a flowchart of a method 500 of printing a machine-readable data representation on a target object in accordance with an embodiment. The method 500, for example, may employ or be performed by structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 500 may be able to be used as one or more algorithms to direct hardware (e.g., portions, aspects, and/or variations of the method may be implemented by one or more aspects of the controller 108 using instructions stored on the memory 118) to perform one or more operations described herein.

At 502, data that is to be represented by the machine-readable data representation is input into the controller 108. For example, the operator can engage the interface 115 to enter in bar code data. Optionally, the operator may select the data from a set of previously stored data within the memory 118 associated with the controller 108. The controller 108 may process the data for transmission to the print heads 110 for printing. For example, the controller 108 may rasterize the data according to an algorithm into two colors (e.g. black and white) that can be printed on the target objects 106 as a multilayer or interdigitated pattern to render the machine-readable data representation 112 in accordance with the parameters associated with a verification standard.

At 504, one or more target objects 106 are loaded onto the conveyance system 104. When loaded onto the conveyance system 104, the target objects 106 may be aligned along or parallel to a printing or travel direction 114 so that the area to be printed is generally perpendicular to the print heads 110. For example, target objects 106 may be loaded at a loading zone at predetermined intervals with a loading system, such as an additional conveyance system. Information from an encoder or sensor of the conveyance system 104 may be used to determine when the target object 106 is at the loading zone. Optionally, target objects 106 may be loaded at the loading zone manually by operators.

At 506, the conveyance system 104 moves the target object 106 in a travel direction 114 towards the print zone 116 of a print head 110. For example, the controller 108 may send control signals to the conveyance system 104 to advance a conveyor belt at a continuous or variable speed to move the target object 106 in the travel direction 114 so that the target object 106 passes through the print zone 116 of the print head 110. Optionally, as the target object 106 is advanced, the controller 108 may monitor positional information, such as position, velocity, orientation, and the like, regarding the target object 106 using encoders, sensors, and the like.

At 508, when the controller 108 determines that the target object 106 is within the print zone 116 of the print head 110, flow of the method 500 can advance toward 510. For example, information from an encoder or sensor of the conveyance system 104 or print head 110 may be used to determine whether the target object 106 is at, within, or approaching the print zone 116. Otherwise, if the controller 108 determines that no target object 106 is at or within the print zone 116 of the print head 110, flow of the method 500 can advance toward 506 to continue moving the target object 106 with the conveyance system 104. For example, the controller 108 may send control signals to the conveyance system 104 to advance the conveyor to continue moving the target object 106 in the travel direction 114 toward the print zone 116 of the print head 110.

At 510, the controller 108 transmits the data to be represented by the machine-readable data representation to the print heads 110. For example, the controller 108 transmits the bar code data that was previously selected by the operator from the memory 118 by the operator at 502. Alternatively, the data could be provided by a centralized factory control system, controlling one or more conveyance systems.

At 512, the print head 110 prints a first color onto the target object 106. For example, when printing a multilayer machine-readable data representation 112 the controller 108 sends a control signal to direct the first set of nozzles 202 of the print head 110 to apply the base or background layer of ink 302 (e.g. white ink or ink of another color) onto the target object 106. Alternatively, when printing an interdigitated pattern machine-readable data representation 112 the controller 108 sends a control signal to the first set of nozzles 202 of the print head 110 to apply the first color 402 of the interdigitated pattern (e.g. white ink or ink of another color) onto the target object 106.

At 514, the print head 110 prints a second color onto the target object 106. For example, for printing a multilayer machine-readable data representation 112, the controller 108 sends a control signal to direct the second set of nozzles 204 of the print head 110, or a second print head, to apply the upper or foreground layer of ink 304 (e.g. black ink or ink of another color) on top of the base layer of ink 302, thereby forming the machine-readable data representation 112. This type of data representation 112 can be referred to as a multi-layer data representation 112. Alternatively, for printing an interdigitated pattern machine-readable data representation 112, the controller 108 can send a control signal to the second set of nozzles 202 of the print head 110, or to a second print head, to apply the second color 404 of the interdigitated pattern onto the target object 106 so that none of the colors is printed on top of another color, thereby forming the machine-readable data representation 112. This type of data representation 112 can be referred to as an interdigitated data representation.

At 516, the target object 106 is unloaded from the conveyance system 104. For example, the target object 106 may be unloaded at an unloading zone with an unloading system, such as an additional conveyance system. Information from an encoder or sensor of the conveyance system 104 may be used to determine whether the target object 106 is at the unloading zone. Optionally, target objects 106 may be manually unloaded at by operators.

In the illustrated embodiment of FIGS. 1 through 5, the print heads 110 are stationary with the target objects 106 moving through the print zone 116 by the conveyance system 104 in the travel direction 114. In another embodiment, however, the target objects 106 may remain stationary while the print heads 110 are moved along a travel or printing direction 606. Optionally, both the print heads 110 and the target objects 106 can concurrently move during printing of the representation 112 on at least one of the target objects 106. The print heads 110 and the target objects 106 can move in the same direction at the same or different speeds, can move in opposite directions, or can move in transverse directions.

Figure 6:
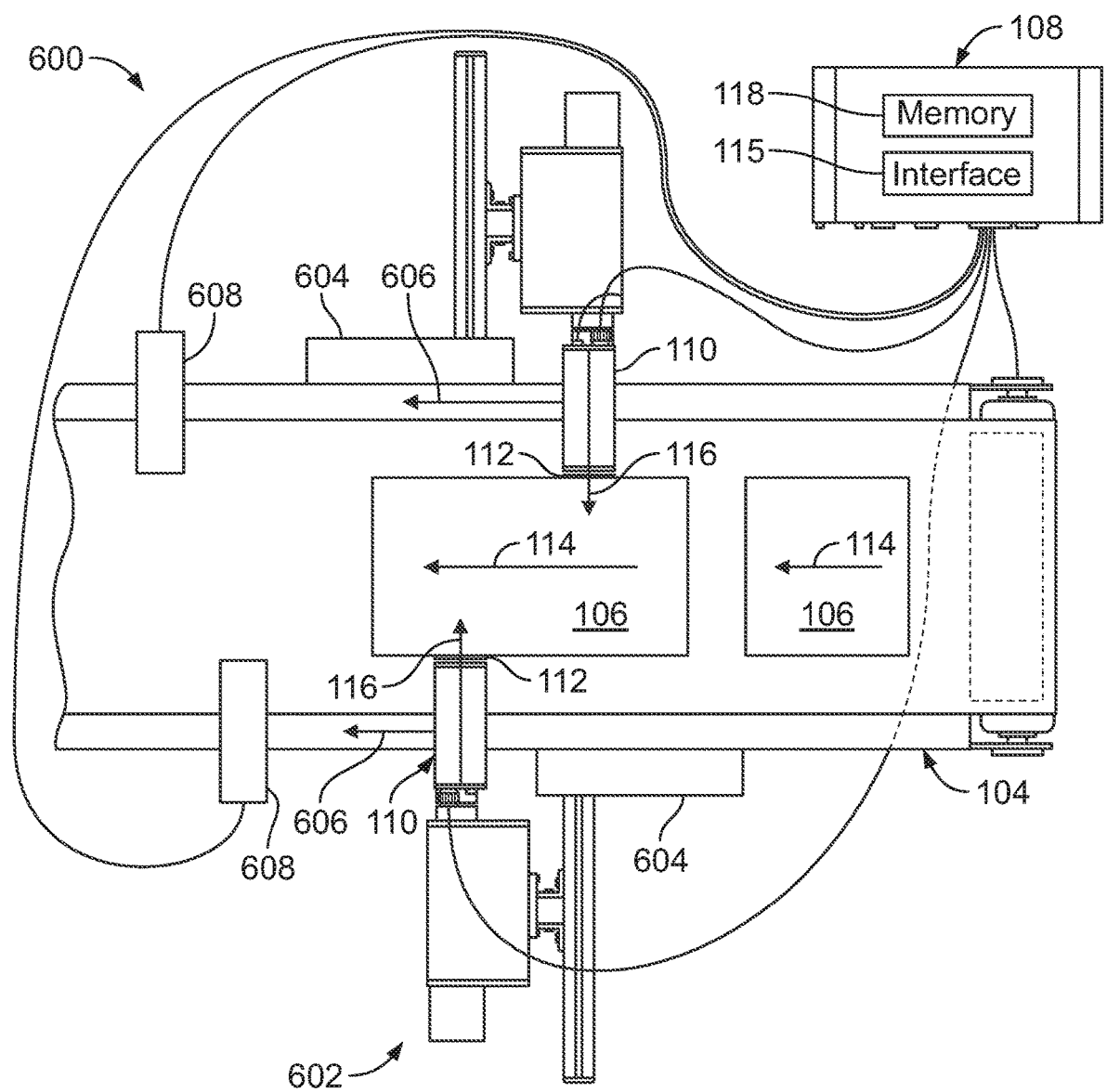
FIG. 6 is a schematic diagram of a printing system in accordance with another embodiment.

FIG. 6 is a schematic diagram of a printing system 600 in accordance with another embodiment. The printing system 600 includes a printing assembly 602 may be used in place of the printing assembly 102 shown in FIGS. 1 through 2 in the printing system 600. One difference between the printing assemblies 102 and 602 is that each print head 110 is connected to a conveyance system 604 that can move the print heads 110 in a printing direction 606 through the print zone 116 while the target objects 106 remain stationary or substantially stationary. Also, the printing system 600 includes curing devices 608 disposed after the print heads 110 relative to the travel direction 114 that assist in curing the inks deposited onto the target objects 106 by the print heads 110.

The conveyance system 604 is operatively connected to the controller 108 to move the print heads 110 along the printing direction 606 through the print zone 116 associated with the print heads 110 for printing the machine-readable data representation 112 according to a set of parameters associated with a grading standard. For example, the machine-readable data representation 112 may be formed from one or more different colors in a multilayer or interdigitated pattern that have a symbol contrast of at least 40% and/or meet at least a Grade C of a GS-1 2d bar code verification standard. However, the machine-readable data representation 112 may be formed according the parameters of any machine-readable symbology, including, but not limited to Universal Product Code (UPC), Interleaved Two of Five (ITF), European Article Number (EAN), and other standards. The parameters associated with the grading standard may include, but are not limited to symbol contrast, reflectance, edge contrast, modulation, defects, decodability, bar width deviation, and the like.

The controller 108 may control when the conveyance system 604 moves the print heads 110, which direction(s) the print heads 110 are moved, how fast the print heads 110 are moved, and the like. The conveyance system 604 can include one or more belts, tracks, rails, or the like, that move or convey the print heads 110. While a conveyor belt system is shown in the illustrated embodiment, it may be noted that other systems, including linear guide systems and/or magnet driven systems, may be utilized as a conveyance system in other embodiments. The conveyance system 604 can also include one or more encoders, sensors, and the like to determine positional information regarding the print heads 110 as they move along the printing direction, such as position, velocity, orientation, and the like.

The conveyance system 604 can index each target object 106 to and from the print zone 116. For example, one or more target objects 106 are loaded onto the conveyance system 604. In one aspect, the target objects 106 can be separately placed onto the conveyance system 604 in a loading area. For target objects 106 to be printed on next by the printing heads 110, the conveyance system 604 moves or indexes the target objects 106 in a travel direction 114 to the print zone 116. The target objects 106 are aligned with the print heads 110 of the printing assembly 102 along a travel direction 114.

The conveyance system 604 moves the print heads 110 along the printing direction 606 to print the machine-readable data representation 112 onto the target object 106 as a multilayer or interdigitated pattern. The embodiment depicts the printing direction 606 as being the same direction as the travel direction 114. Optionally, the conveyance system 604 may move the print heads 110 in the opposite direction of the travel direction 114 to print the machine-readable data representation 112 onto the target object 106. Subsequently, the conveyance system 604 may index the target objects 106 in the travel direction 114 in order to align the next target object 106 with the print zone 116 of the print heads 110. For example, the conveyance system 604 may incrementally move the objects 106 on the conveyance system 604 in the travel direction 114 so that the target object 106 that was just printed on is no longer aligned with the print zone 116, but the next target object 106 that has not yet been printed upon is aligned with the print zone 116. The printing system 100 can repeat this process for additional target objects 106.

The printing system 600 also includes curing devices 608 disposed after the print heads 110 along the travel direction 114 (or along a direction that is parallel to the travel direction 114). The curing devices 608 generate energy that assists in curing the inks deposited onto the target objects 106 by the print heads 110. For example, the curing devices 608 may generate UV light, plasma, heat, airflow, or the like, to speed up the curing of a recently deposited ink by the print heads 110. The number and/or arrangement of the print heads 110 and/or curing devices 608 may vary from that shown in FIG. 6. For example, fewer or more print heads 110 may be used, more or fewer curing devices 608 may be used, or the like.

In one embodiment, a printing system includes one or more print heads configured to print different colors onto a target object to form a machine-readable data representation on the target object having a symbol contrast of at least 40%. The printing system also includes a controller configured to direct the one or more print heads to print the different colors by directing the one or more print heads to one or more of print the machine-readable data representation as a multilayer data representation by printing a base layer of a first color of the different colors on the target object and printing an upper layer of a different, second color of the different colors on top of the base layer of the first color, or print the machine-readable data representation as an interdigitated data representation by printing the different colors onto the target object so that none of the different colors is printed on top of another color of the different colors.

Optionally, the controller is configured to direct the one or more print heads to print the machine-readable data representation on an area of the target object that is formed from corrugated cardboard.

Optionally, the controller is configured to direct the one or more print heads to print the machine-readable data representation on an area of the target object that is formed from a non-porous material.

Optionally, the printing system also includes one or more curing devices configured to cure or dry the machine-readable data representation printed on the target object.

Optionally, the one or more print heads are configured to print the machine-readable data representation on the target object with a symbol contrast of at least a Grade C of a GS-1 2D bar code verification standard.

In one embodiment, a printing method includes aligning a target object along or parallel to a travel direction, moving one or more of a printing assembly or the target object along the travel direction, and printing a machine-readable data representation with two or more inks of different colors onto the target object to form the machine-readable data representation on the one or more target objects as having a symbol contrast of at least 40%.

Optionally, printing the machine-readable data representation includes printing separate layers of ink in an interdigitated pattern to form an interdigitated machine-readable data representation.

Optionally, printing the machine-readable data representation includes interdigitating the two or more inks onto the target object so that none of the inks is printed on top of another ink within the machine-readable data representation.

Optionally, printing the machine-readable data representation includes printing plural different layers of the inks onto the target object, with at least two of the layers of the inks printed on top of each other.

Optionally, printing the machine-readable data representation includes printing a base layer of a first color of the different colors of the inks on the target object and printing an upper layer of a different, second color of the different colors of the inks on the base layer of the first color.

Optionally, the machine-readable data representation includes a bar code with a symbol contrast of at least 40%.

Optionally, the method also includes applying a clear coating layer to the target object prior to printing the machine-readable data representation on the clear coating layer.

In one embodiment, a printing system includes a printing assembly having one or more print heads configured to print two or more inks onto a target object having a porous surface, and a conveyance system configured to move one or more of the printing assembly or the target object in a travel direction. The conveyance system is configured to move the one or more of the printing assembly or the target object in the travel direction so that the one or more print heads complete printing of a machine-readable data representation formed by the two or more inks onto the target object during one or more of a single pass of the printing assembly over the target object or a single pass of the target object below the printing assembly. The machine-readable data representation is printed to have a symbol contrast of at least 40%.

Optionally, the one or more print heads are configured to print layers of the inks in an interdigitated pattern to form the machine-readable data representation as an interdigitated machine-readable data representation.

Optionally, the one or more print heads are configured to print plural different layers of the inks on top of each other on the target object to form the machine-readable data representation as a multi-layer machine-readable data representation.

Optionally, the machine-readable data representation that is printed is a bar code with a symbol contrast of at least 40%.

Optionally, the printing assembly includes one or more curing devices configured to cure the inks during the one or more of the single pass of the printing assembly over the target object or the single pass of the target object below the printing assembly.

Optionally, the one or more print heads are configured to print the machine-readable data representation on the target object with a symbol contrast of at least a Grade C of a GS-1 2D bar code verification standard.

Optionally, the machine-readable data representation that is printed is a QR code.

Optionally, the machine-readable data representation that is printed is a two-dimensional bar code with a symbol contrast of at least 40%.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

It should be noted that the particular arrangement of components (e.g., the number, types, placement, or the like) of the illustrated embodiments may be modified in various alternate embodiments. For example, in various embodiments, different numbers of a given module or unit may be employed, a different type or types of a given module or unit may be employed, a number of modules or units (or aspects thereof) may be combined, a given module or unit may be divided into plural modules (or sub-modules) or units (or sub-units), one or more aspects of one or more modules may be shared between modules, a given module or unit may be added, or a given module or unit may be omitted.

As used herein, a processor or a processing unit includes processing circuitry configured to perform one or more tasks, functions, or steps, such as those described herein. For instance, the processor may be a logic-based device that performs operations based on instructions stored on a tangible and non-transitory computer readable medium, such as memory. It may be noted that a "processor," as used herein, is not intended to necessarily be limited to a single processor or single logic-based device. For example, the processor may include a single processor (e.g., having one or more cores), multiple discrete processors, one or more application specific integrated circuits (ASICs), and/or one or more field programmable gate arrays (FPGAs). In some embodiments, the processor is an off-the-shelf device that is appropriately programmed or instructed to perform operations, such as the algorithms described herein.

The processor may also be a hard-wired device (e.g., electronic circuitry) that performs the operations based on hard-wired logic that is configured to perform the algorithms described herein. Accordingly, the processor may include one or more ASICs and/or FPGAs. Alternatively, or in addition to the above, the processor may include or may be associated with a tangible and non-transitory memory having stored thereon instructions configured to direct the processor to perform the algorithms described herein.

It is noted that operations performed by the processor (e.g., operations corresponding to the methods/algorithms described herein, or aspects thereof) may be sufficiently complex that the operations may not be performed by a human being within a reasonable time period. The processor may be configured to receive signals from the various sub-systems and devices of the system or user inputs from the user. The processor may be configured to perform the methods described herein.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a processing unit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general-purpose computer (which may become "configured to" perform the task or operation if appropriately programmed) is not "configured to" perform a task or operation unless or until specifically programmed or structurally modified to perform the task or operation.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A printing method comprising:
   moving a target object that includes corrugated material along a travel direction; and
   printing a bar code onto the corrugated material of the target object with a black ink and a white ink in an interdigitated pattern of first areas and second areas to form the bar code with a symbol contrast of at least 40% for accurate scanning of the bar code, the bar code printed by printing the black ink in the first areas and the white ink in the second areas to fill the first and second areas in the interdigitated pattern.

2. The printing method of claim 1, the first areas and the second areas do not overlap each other.

3. The printing method of claim 1, wherein printing the bar code includes printing separate layers of the black ink and the white ink in the interdigitated pattern to form an interdigitated bar code.

4. The printing method of claim 1, wherein printing the bar code includes interdigitating the black ink and the white ink onto the corrugated material so that none of the black ink is printed on top of the white ink within the bar code.

5. The printing method of claim 1, wherein printing the bar code includes printing plural different layers of the black ink and the white ink onto the corrugated material.

6. The printing method of claim 1, further comprising:
   applying a clear coating layer to the corrugated material prior to printing the bar code on the clear coating layer.

7. A method comprising:
   printing a black ink to fill first areas of a bar code on a corrugated material surface; and
   printing a white ink to fill different, second areas of the bar code on the corrugated material surface,
   wherein the bar code has a symbol contrast of at least 40% for scanning of the bar code while on the corrugated material surface.

8. The method of claim 7, wherein the first areas and the second areas are interdigitated with each other.

9. The method of claim 7, wherein the first areas and the second areas are different, non-overlapping areas.

10. The method of claim 7, wherein printing the black ink and printing the white ink includes moving the corrugated material surface by a first set of nozzles and a different, second set of nozzles such that the corrugated material surface moves by the first set of nozzles before moving by the second set of nozzles.

11. The method of claim 10, wherein the black ink is printed on the corrugated material surface by the first set of nozzles and the white ink is printed on the corrugated material surface by the second set of nozzles.

12. The method of claim 7, further comprising:
    printing a clear coat layer on the corrugated material surface in the first areas and the second areas such that the black ink and the white ink are printed on the clear coat layer to form the bar code on the clear coat layer.

13. The method of claim 12, wherein the clear coat layer is printed only on the first and second areas such that the clear coat layer extends only over the corrugated material surface where the bar code is printed.

14. The method of claim 7, wherein printing the black ink and printing the white ink occurs during a single pass of the corrugated material surface by print heads that print the black ink and the white ink onto the corrugated material surface.

15. A printing system comprising:
    one or more print heads configured to print a bar code onto corrugated material of a target object with a black ink and a white ink in an interdigitated pattern of first areas and second areas to form the bar code with a symbol contrast of at least 40% for accurate scanning of the bar code, the bar code printed by printing the black ink in the first areas and the white ink in the second areas to fill the first and second areas in the interdigitated pattern.

16. The printing system of claim 15, the first areas and the second areas do not overlap each other.

17. The printing system of claim 15, wherein the one or more print heads are configured to print the bar code by printing separate layers of the black ink and the white ink in the interdigitated pattern to form an interdigitated bar code.

18. The printing system of claim 15, wherein the one or more print heads are configured to print the bar code by interdigitating the black ink and the white ink onto the corrugated material so that none of the black ink is printed on top of the white ink within the bar code.

19. The printing system of claim 15, wherein the one or more print heads are configured to print the bar code by printing plural different layers of the black ink and the white ink onto the corrugated material.

20. The printing system of claim 15, wherein the one or more print heads are configured to apply a clear coating layer to the corrugated material prior to printing the bar code on the clear coating layer.

21. A printing method comprising:

moving a printing assembly along a travel direction; and printing a bar code onto a target object that includes corrugated material using the printing assembly, the bar code printed by the printing assembly with a black ink and a white ink in an interdigitated pattern of first areas and second areas to form the bar code with a symbol contrast of at least 40% for accurate scanning of the bar code, the bar code printed by printing the black ink in the first areas and the white ink in the second areas to fill the first and second areas in the interdigitated pattern.

* * * * *